United States Patent [19]

Satoh et al.

[11] Patent Number: 4,958,502
[45] Date of Patent: Sep. 25, 1990

[54] CONTROLLER FOR A REFRIGERATION UNIT

[75] Inventors: Shinji Satoh; Kanji Isomichi; Hiroshi Ogawa; Toshio Yamashita; Nobuhiro Funahashi, all of Aichi, Japan

[73] Assignee: Mitsubishi Jukogyo K.K., Tokyo, Japan

[21] Appl. No.: 421,299

[22] Filed: Oct. 10, 1989

Related U.S. Application Data

[63] Continuation of Ser. No. 293,814, Jan. 5, 1989, abandoned.

[30] Foreign Application Priority Data

Jan. 5, 1988 [JP] Japan ................................ 63-500

[51] Int. Cl.$^5$ .............................................. F25B 49/00
[52] U.S. Cl. ........................................ 62/126; 236/94; 235/375
[58] Field of Search .............. 236/94; 165/11; 62/126; 364/571.08; 235/557, 375

[56] References Cited

U.S. PATENT DOCUMENTS

| | | | |
|---|---|---|---|
| 3,775,595 | 11/1973 | Rosse et al. | 235/375 |
| 4,102,492 | 7/1978 | Gold et al. | 235/375 |
| 4,448,035 | 5/1986 | Moriyama | 165/43 |
| 4,663,725 | 5/1987 | Truckenbrod et al. | 364/505 |

FOREIGN PATENT DOCUMENTS

| | | |
|---|---|---|
| 213748 | 9/1984 | Fed. Rep. of Germany . |
| 2590381 | 5/1987 | France . |
| 2052800A | 11/1981 | United Kingdom . |
| 2116748A | of 1983 | United Kingdom . |
| 2183368A | of 1987 | United Kingdom . |

Primary Examiner—William E. Wayner
Attorney, Agent, or Firm—Stanger, Michaelson, Spivak & Wallace

[57] ABSTRACT

A controller which controls a refrigerating unit so that a temperature detected by a controlled temperature detector is equal to a setting temperature, includes a memory for storing the temperature detected by the detector, a card data input-output unit for reading data from a card and writing data in the card, a reading unit of the card data from the input-output unit, and a discriminator for discriminating whether the card is a setting card or a recording card on the basis of the card data read from the reading unit, whereby (a) when the discriminator discriminates that the card is the setting card, the setting temperature is set on the basis of the card data, and (b) when the discriminator discriminates that the card is the recording card, the temperature data stored in the memory is read to be written in the recording card through card data input-output unit, so that administration of data such as the setting temperature and the controlled temperature by a computer is attained and wrong setting of the temperature by the operator can be eliminated.

3 Claims, 8 Drawing Sheets

CONTROLLER FOR A REFRIGERATION UNIT

This is a continuation of application Ser. No. 293,814, now abandoned, filed Jan. 5, 1989.

FIELD OF THE INVENTION AND RELATED ART STATEMENT

The present invention relates to a controller of a refrigerating unit.

FIG. 9 shows an example of a conventional refrigerating unit, FIG. 7 shows in detail a controller 9b used in the refrigerating unit of FIG. 9, and FIG. 8 shows in detail a recording unit 25 used in the refrigerating unit of FIG. 9.

A conventional refrigerating cycle is now described. A gas refrigerant compressed by a compressor 12 to have a high temperature and a high pressure flows into a condenser 15. Further, it also flows into a bypass circuit including an electronic control valve 14. Heat of the gas refrigerant is radiated in the condenser 15 and the gas refrigerant is condensed to liquid to reach an expansion valve. The decompressed refrigerant is fed to an evaporator 17 to take off heat of air passing through the evaporator 17 so that the refrigerant is evaporated and returned to the compressor 12 to thereby complete the refrigerating cycle.

Description is now made to control of the refrigerating capacity.

In the controller 9b, a controlled temperature is determined by decision means 20 of the controlled temperature to a temperature detected by a temperature detector 10a of blowing air or a temperature detector 11a of suction air. A temperature data set by a setting temperature input switch 18 is supplied to decision means 19 of setting temperature to determine a setting temperature. Control means 21 controls an opening of an electronic control valve 14 so that the controlled temperature is equal to the setting temperature. At this time, when the opening of the valve is increased, the refrigerating capacity is reduced and when opening is decreased, the refrigerating capacity is increased. Accordingly, the controlled temperature can approach to the setting temperature by adjusting the opening of the valve.

The refrigerating unit is provided with a recording unit 25 so as to record how the controlled temperature changes. The recording unit 25 determines a recording temperature by means of decision means 23 on the basis of information supplied from a blowing air temperature detector 10b and a suction air temperature detector 11b provided separately from the temperature detectors for the controller 9b and a temperature selection switch 27 and records the controlled temperature on a circular chart 26 by means of recording means 24.

The method of determining the setting temperature and the method of recording the controlled temperature of the above conventional refrigerating unit have problems as follows.

(1) Since the setting of temperature is made by operation of an operator, the setting temperature may be set by mistake.

(2) It is difficult to perform the batch data processing by a computer.

(3) It is difficult to administer recording paper for the controlled temperature.

(4) Since the recording unit is provided separately, much space is required and a cost is high.

(5) It is impossible to obtain control information except the temperature information.

(6) It is necessary to write selection information such as the setting temperature on the recording paper and to replace the recording paper.

OBJECT AND SUMMARY OF THE INVENTION

The present invention has been made in view of the above problems and an object of the present invention is to provide a controller of a refrigerating unit capable of resolving the conventional problems.

In order to achieve the above object, the configuration of the present invention is as follows.

The controller of the refrigerating unit which controls the refrigerating unit so that a temperature detected by detection means of controlled temperature is equal to a setting temperature, is characterized by the provision of means for storing the temperature detected by the detection means, a card data input-output unit for reading data from a card and writing data to the card, card data reading means for reading the card data from the input-output unit, means for discriminating whether the card is a setting card or a recording card on the basis of the card data read by the card data reading means, setting temperature decision means for deciding the setting temperature on the basis of the card data when the discriminating means discriminates that the card is the setting card, and card data writing means for reading the stored data in the storing means and writing the data in the recording card by means of the card data input-output unit when the discriminating means discriminates that the card is the recording card.

In operation, according to the present invention, since the refrigerating unit includes the card data input-output unit which can read data from the card and write data to the card and the selection means of the setting card and the recording card, unification of the data processing by a computer such as a microcomputer can be attained and control of the setting temperature and the controlled temperature is easy with the result that wrong setting of the temperature is removed. Further, since there is no recording unit, the apparatus can be made smaller and the cost thereof is reduced.

According to the present invention, the refrigerating unit is provided with the data input-output unit which can read data from the card and write data to the card and the selection means of the setting card and the recording card and the following effects can be attained.

(1) Data control such as the setting temperature and the controlled temperature can be made by a computer and analysis and preservation of data can be made easily.

(2) Since there is no recording unit, the apparatus is made smaller and the cost thereof can be reduced.

(3) There is nothing that the operator sets and accordingly wrong setting by the operator is eliminated.

DETAILED DESCRIPTION OF A PREFERRED EMBODIMENT

Figure 1:
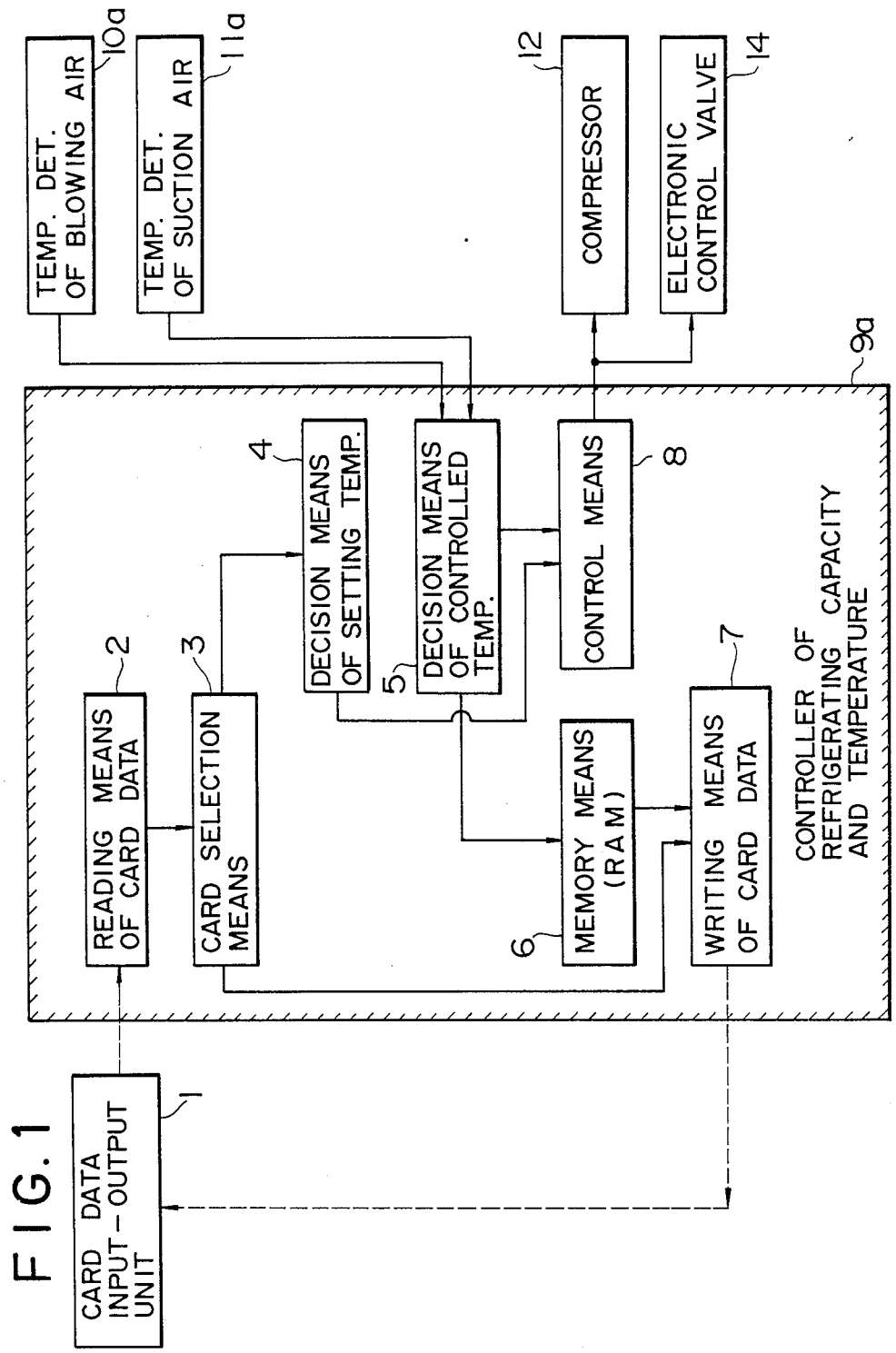
FIG. 1 is a block diagram showing a configuration of an embodiment of the present inventon.
Figure 2:
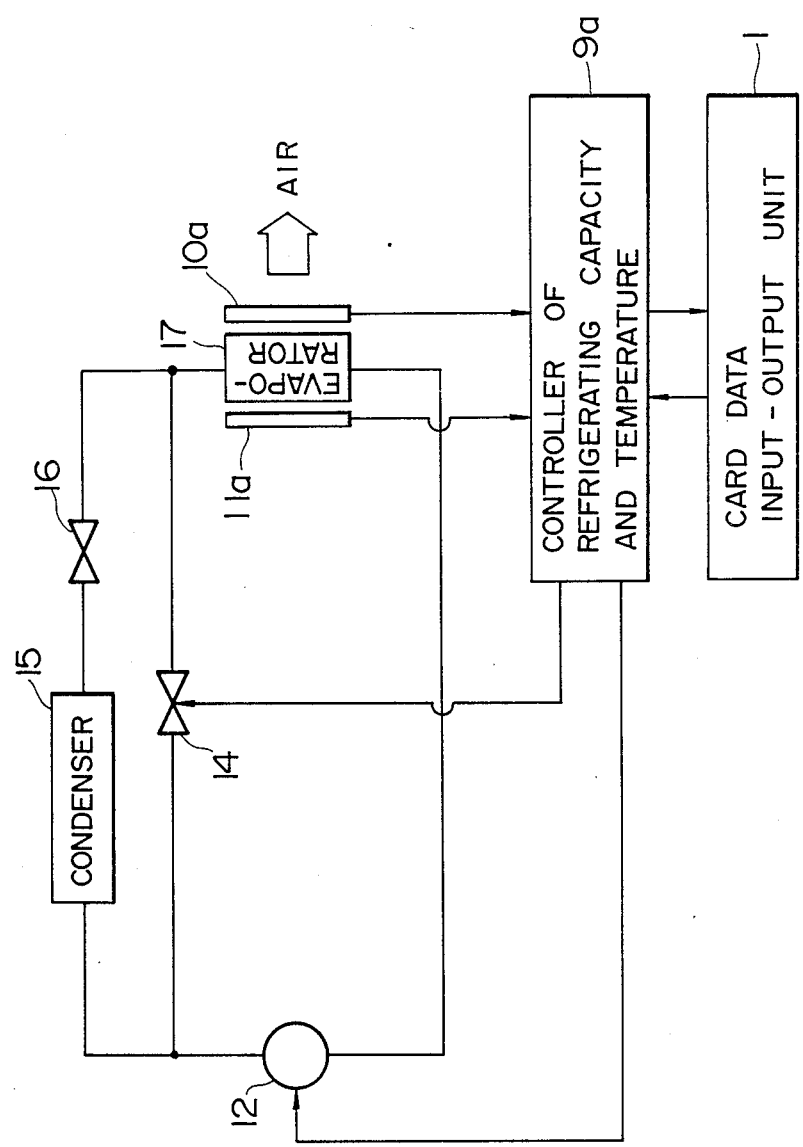
FIG. 2 is a refrigerant circuit diagram of a refrigerating unit according to an embodiment of the present invention.

FIG. 1 is a block diagram of a controller of refrigerating capacity and temperature and FIG. 2 shows a whole configuration of a refrigerating unit according to the present invention.

The refrigerating cycle of the refrigerating unit shown in FIG. 2 is the same as the conventional refrigerating cycle described above and description thereof is hence omitted. Description is now made to the refrigerating capacity control, the setting temperature and the controlled temperature. In the controller 9a of refrigerating capacity and temperature shown in FIG. 1, a temperature detected by a blowing air temperature detector 10a or a suction air temperature detector 11a is supplied to controlled temperature decision means 5 and the controlled temperature is decided to any one of the blowing air temperature and the suction air temperature by the decision means 5. The controlled temperature is temporarily stored in memory means (RAM) 6.

Figure 4:
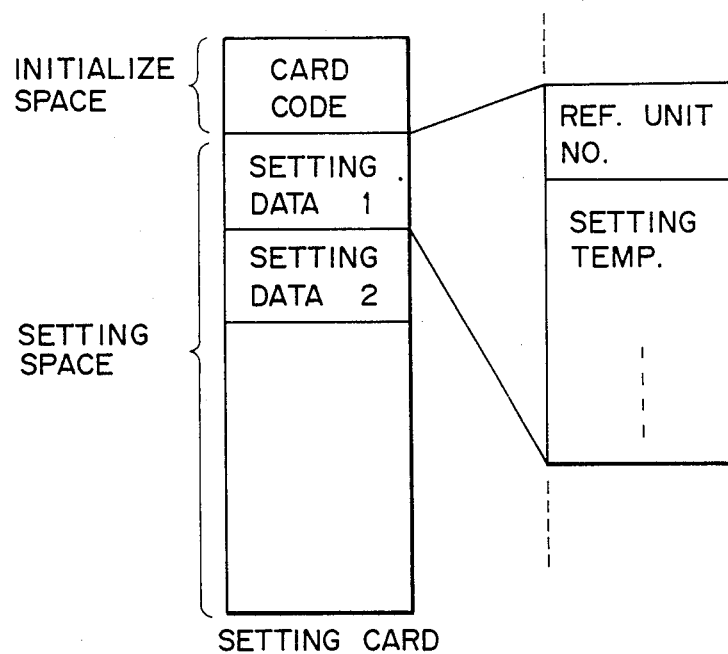
FIG. 4 shows a layout of data in a setting card.
Figure 5:
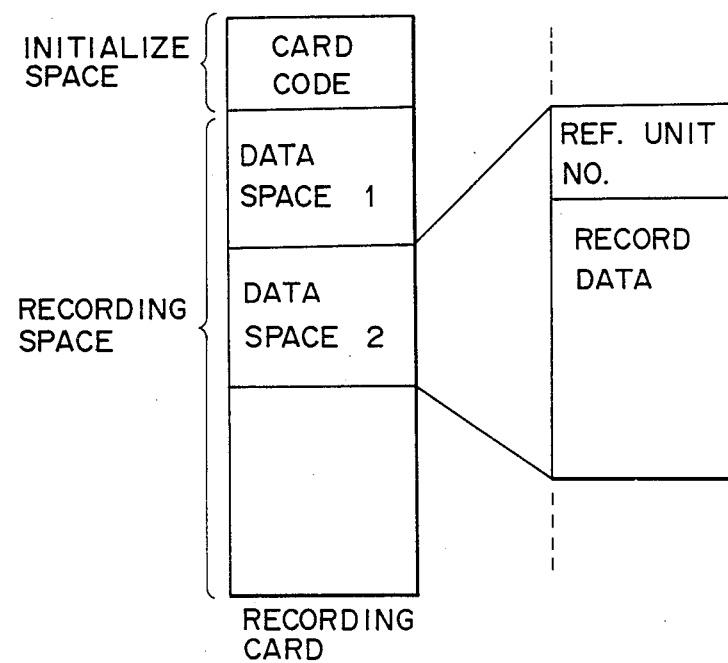
FIG. 5 shows a layout of data in a recording card.

Data of a card is read by card data recording means 2 through a card data input-output unit 1. The card is previously initialized with a card code indicating the setting card or the recording card as shown in FIGS. 4 and 5. Thus, the card code is first read by the card data reading means 2. A single or a plurality of setting data are written in the initialized setting card. Further, as the setting data, the number of the refrigerating unit (abbreviated as REF. UNIT NO. in the drawing) and the setting temperature correponding the unit and other setting values are written.

After the data of the card has been read by the card data reading means 2, the data of the card is supplied to card selection means which discriminates whether the card is the setting card or the recording card.

Consequently, when the card selection means discriminates that the card is the setting card, setting temperature decision means 4 decides the setting temperature on the basis of the number (abbreviated to REF. UNIT NO. in the drawing) of the refrigerating unit and various data corresponding thereto stored in the setting card. The setting temperature signal decided by the setting temperature decision means 4 is supplied to control means 8. The control means 8 controls the opening of an electronic control valve 14 of the refrigerating unit so that the controlled temperature is equal to the setting temperature. The refrigerating cycle is the same as that of the prior art.

Further, when the card selectoin means 3 discriminates that the card is the recording card, card data writing means 7 writes data stored in memory means 6 in the card through the card data input-output unit 1. At this time, the number of the refrigerating unit is first written in the head of the card and subsequently various data is written in the card.

Figure 6:
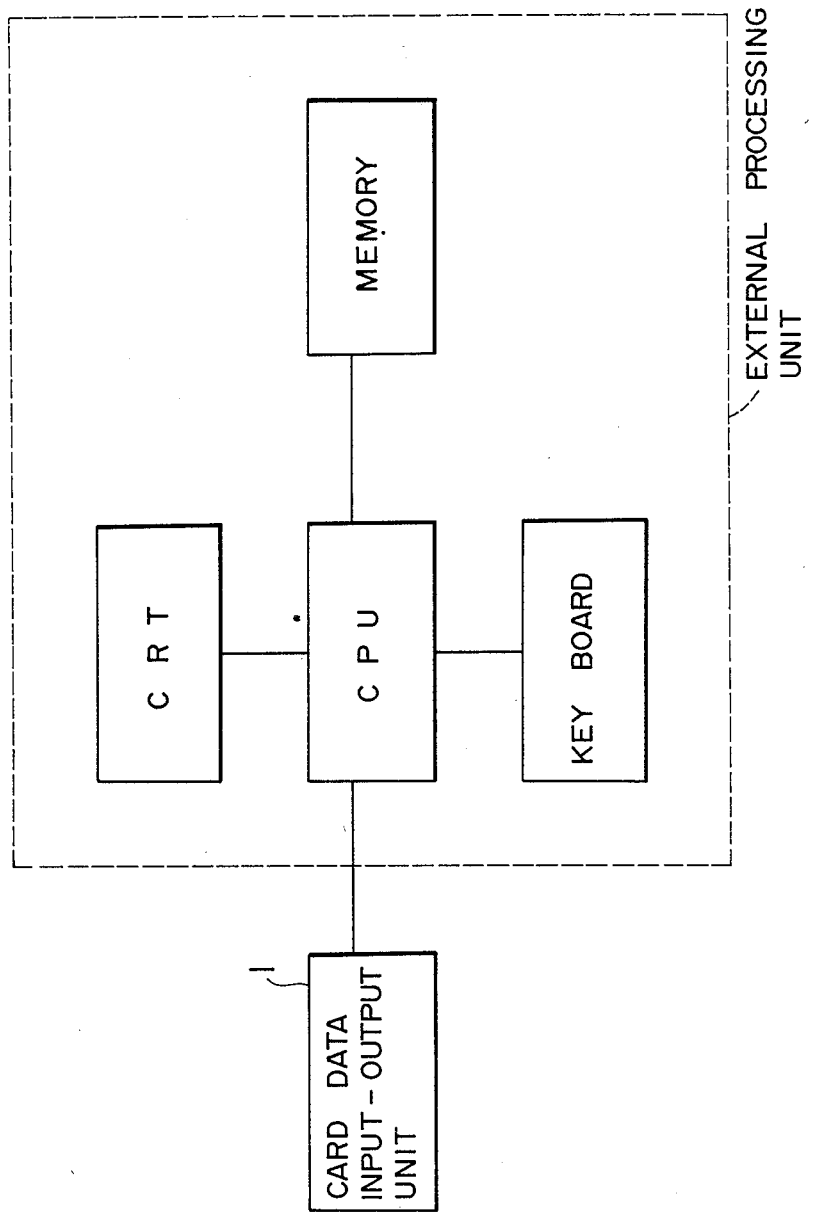
FIG. 6 shows a configuration of an external processing unit (setting card and recording card)
Figure 7:
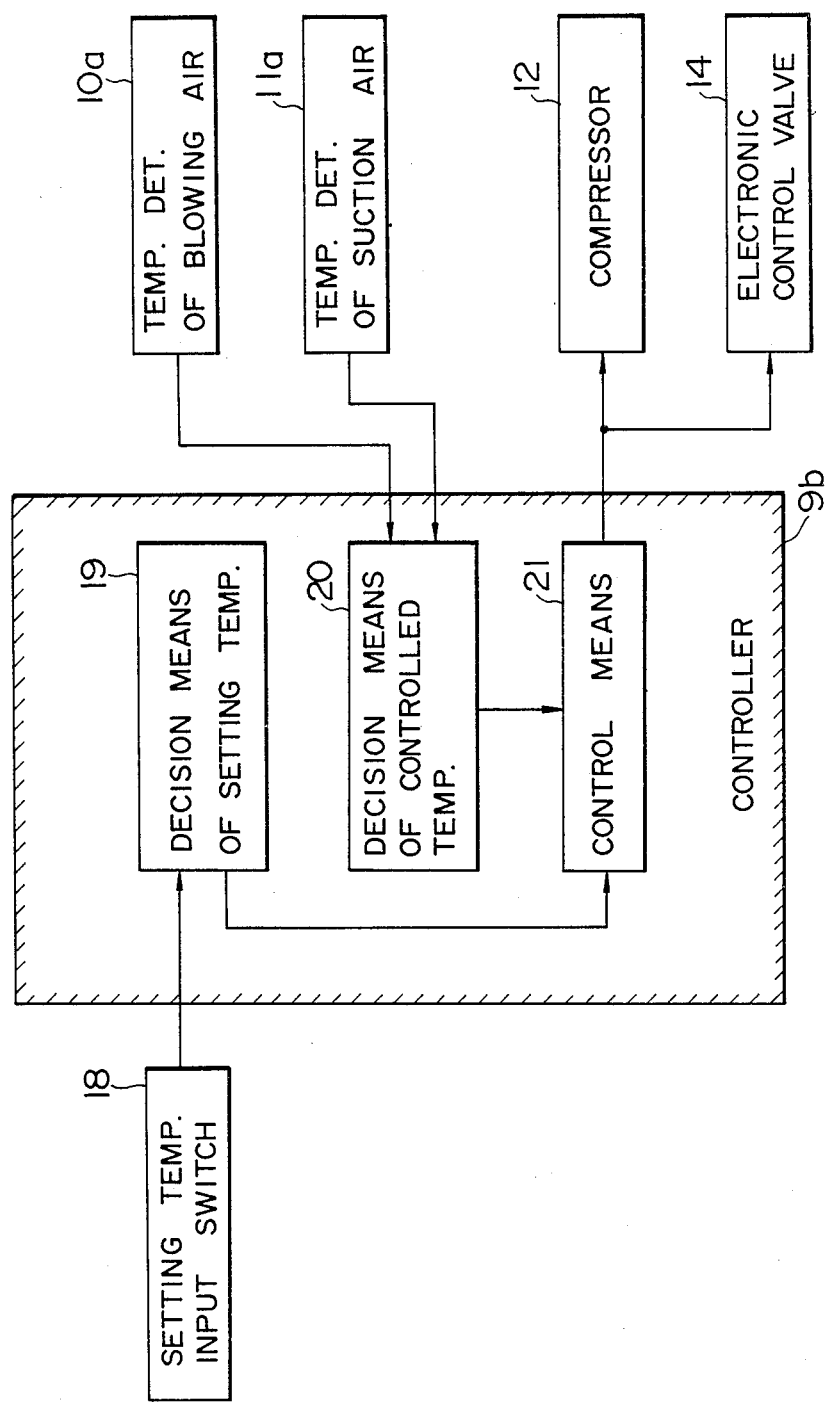
FIG. 7 is a functional block diagram of a controller of a conventional refrigerating unit.
Figure 8:
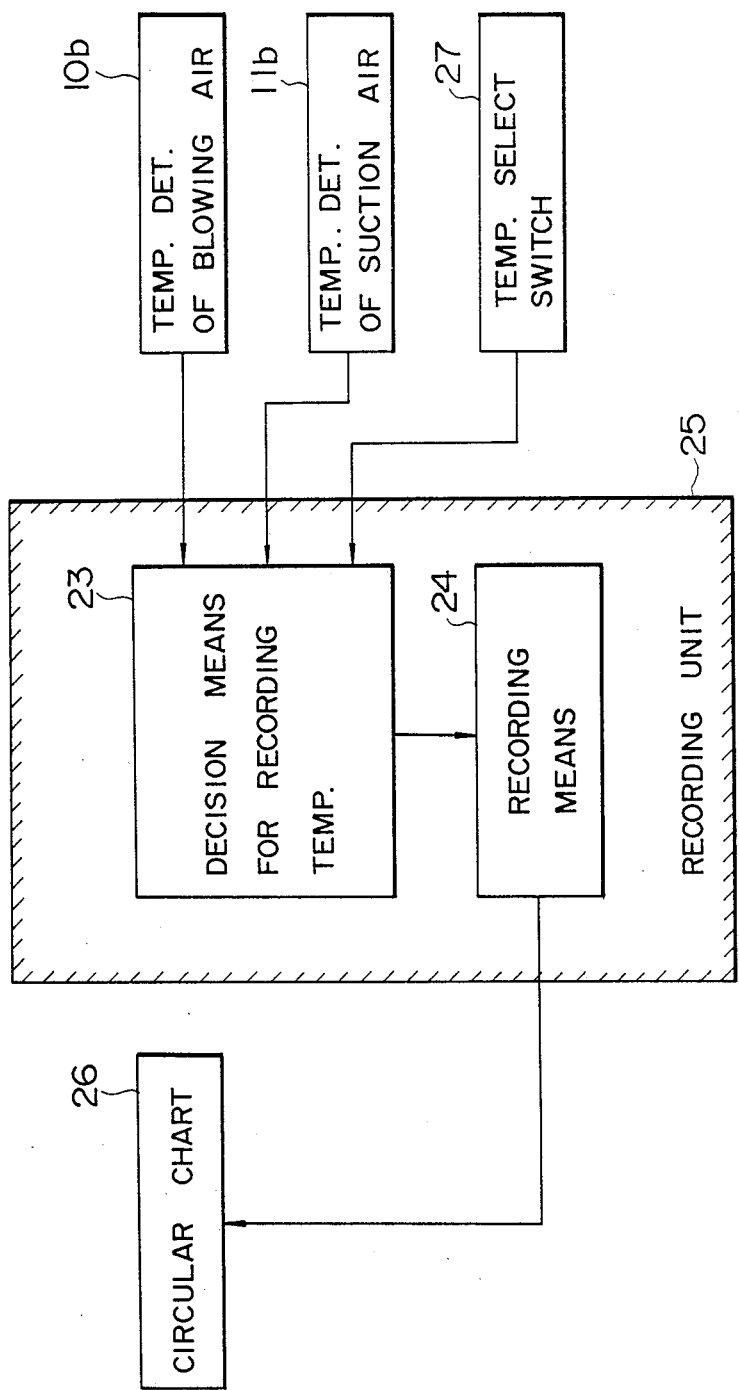
FIG. 8 is a functional block diagram of a recording unit of a conventional refrigerating unit.
Figure 9:
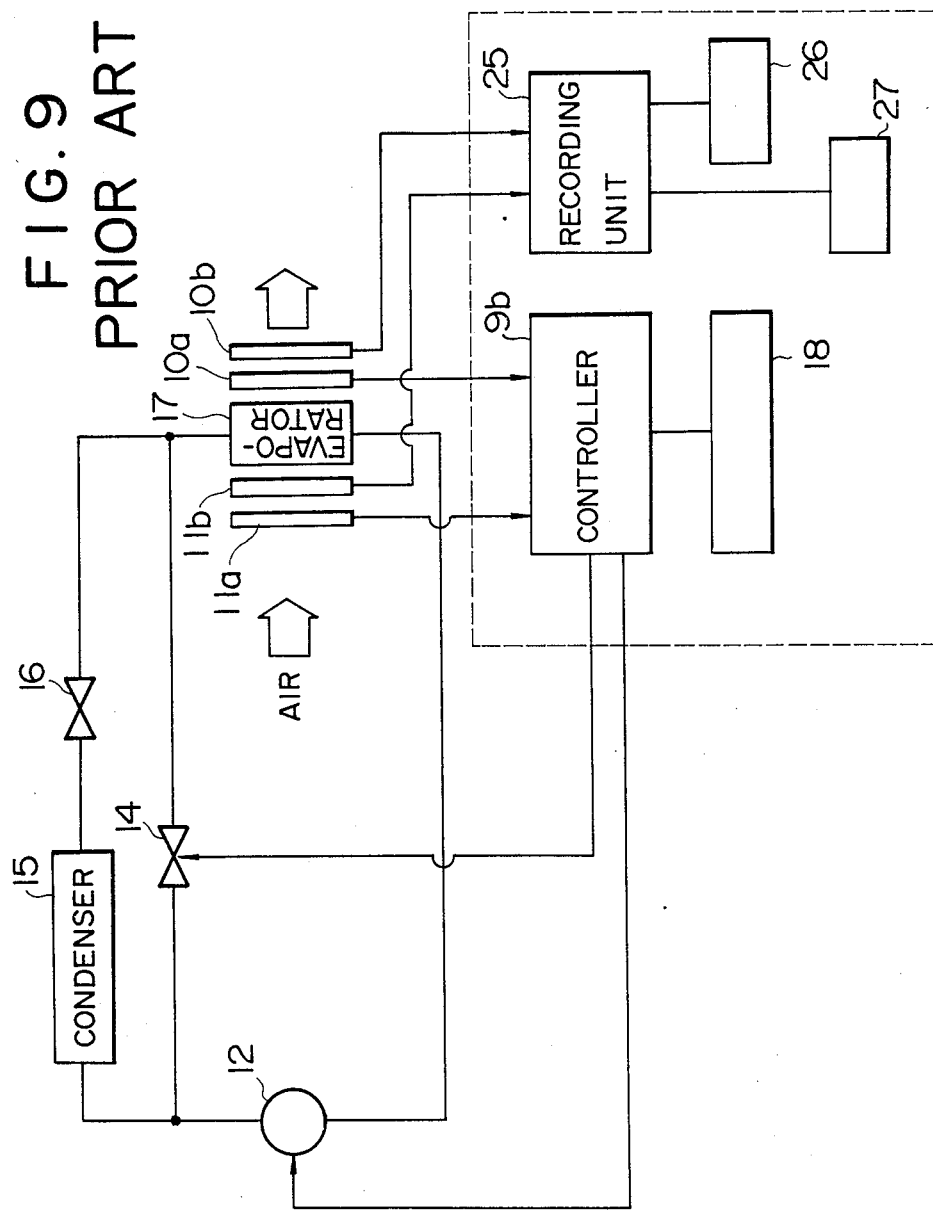
FIG. 9 is a refrigerant circuit diagram of a conventional refrigerating unit.

FIG. 6 shows a writing/reading unit of data to the card by means of an external processing unit, in which display of data by a CRT, storage of data by a memory, analysis of collected data and the like can be attained.

Figure 3:
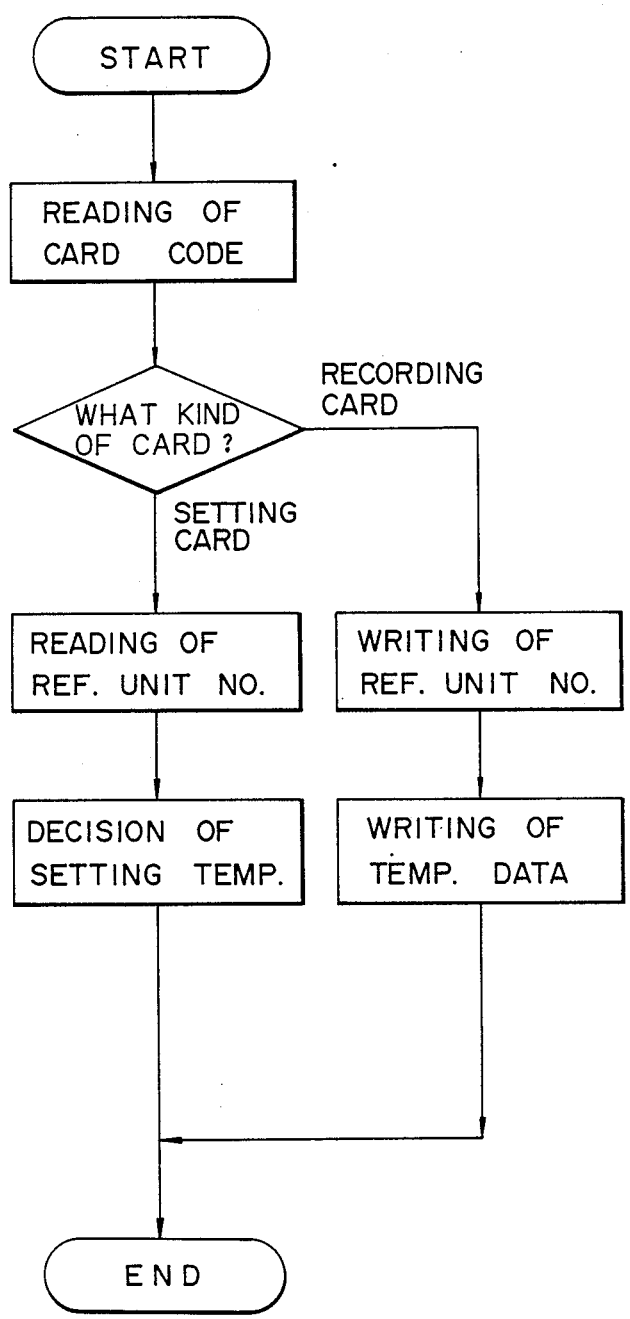
FIG. 3 is a flow chart showing temperature setting and recording operation of the refrigerating unit according to an embodiment of the present invention.

FIG. 3 is a flow chart showing operation of the controller 9a of refrigerating capacity and temperature shown in FIGS. 1 and 2.

We claim:

1. A controller of a refrigerating unit which controls the refrigerating unit so that a temperature detected by controlled temperature detection means is equal to a setting temperature, comprising means for storing the temperature detected by said detection means, a card data input-output unit for reading data from a card and writing data in the card, card data reading means for reading the card data from said input-output unit, means for discriminating whether the card is a setting card or a recording card on the basis of the card data read by said reading means, setting temperature decision means for deciding the setting temperature on the basis of the card data when said discriminating means discriminates that the card is the setting card, and card data writing means for reading the data stored in said storing means and writing the data in the recording card through said card data input-output unit when said discriminating means discriminates that the card is the recording card.

2. A controller of a refrigerating unit according to claim 1, wherein said controlled temperature detection means includes a detector for detecting a temperature of blowing air from an evaporator of the refrigerating unit, a detector for detecting a temperature of suction air to said evaporator, and controlled temperature decision means for deciding any one of the blowing air temperature and the suction air temperature detected by both of said detectors, respectively, as the controlled temperature.

3. A controller of a refrigerating unit according to claim 2, comprising control means for controlling an opening of an electronic control valve of the refrigerating unit so that the controlled temperature decided by said controlled temperature decision means is equal to the setting temperature decided by said setting temperature

* * * * *